United States Patent
Enzinger et al.

(10) Patent No.: US 9,994,121 B2
(45) Date of Patent: Jun. 12, 2018

(54) ENERGY STORE, ENERGY STORE ARRANGEMENT FOR A MOTOR VEHICLE AND MOTOR VEHICLE

(71) Applicant: AUDI AG, Ingolstadt (DE)

(72) Inventors: Tobias Enzinger, Freinhausen (DE); Hao Feng, Ludwigsburg (DE); Thomas Haschberger, Regensburg (DE); Bastian Arndt, Regensburg (DE)

(73) Assignee: AUDI AG, Ingolstadt (DE)

( * ) Notice: Subject to any disclaimer, the term of this patent is extended or adjusted under 35 U.S.C. 154(b) by 0 days. days.

(21) Appl. No.: 15/312,803

(22) PCT Filed: Apr. 14, 2015

(86) PCT No.: PCT/EP2015/000783
§ 371 (c)(1),
(2) Date: Nov. 21, 2016

(87) PCT Pub. No.: WO2015/176788
PCT Pub. Date: Nov. 26, 2015

(65) Prior Publication Data
US 2017/0190263 A1    Jul. 6, 2017

(30) Foreign Application Priority Data

May 21, 2014   (DE) .................. 10 2014 007 780

(51) Int. Cl.
*H01M 2/00*   (2006.01)
*B60L 11/18*   (2006.01)
(Continued)

(52) U.S. Cl.
CPC ......... *B60L 11/1877* (2013.01); *H01M 2/305* (2013.01); *H01M 10/4264* (2013.01); *H01M 2220/20* (2013.01)

(58) Field of Classification Search
CPC .............. B60L 11/1877; H01M 2/305; H01M 10/4264; H01M 2220/20
See application file for complete search history.

(56) References Cited

U.S. PATENT DOCUMENTS 5,815,060 A   9/1998  Matsumoto et al.
6,307,350 B1  10/2001 Alderman
(Continued)

FOREIGN PATENT DOCUMENTS

DE   10 2009 028 970 A1   3/2011
DE   10 2012 202 860 A1   8/2013
(Continued)

OTHER PUBLICATIONS

German Examination Report dated Jan. 12, 2015 in corresponding Application No. 10 2014 007 780.2; 6 pgs.
(Continued)

*Primary Examiner* — Mark F. Huff
*Assistant Examiner* — Monique M Wills
(74) *Attorney, Agent, or Firm* — Maier & Maier, PLLC

(57) ABSTRACT

An energy storage device, including a housing part, in which at least one electrical storage cell as well as a connecting element are arranged. The electrical energy storage cell is electrically connected to an electrical connection arranged or formed on at least one freestanding outer wall section of the housing part. The at least one electrical connecting element is surrounded at least in sections by at least one electromagnetic damping element for attenuation of electromagnetic emissions.

9 Claims, 2 Drawing Sheets

(51) Int. Cl.
*H01M 2/30* (2006.01)
*H01M 10/42* (2006.01)

(56) References Cited

U.S. PATENT DOCUMENTS

| | | | |
|---|---|---|---|
| 2007/0241734 A1 | 10/2007 | Stoicescu et al. | |
| 2010/0104928 A1* | 4/2010 | Nishino | H01M 2/105 429/53 |
| 2011/0112610 A1* | 5/2011 | Rahman | A61N 1/3718 607/60 |
| 2012/0112685 A1 | 5/2012 | Hartley et al. | |
| 2013/0244062 A1 | 9/2013 | Teramoto et al. | |
| 2013/0266828 A1* | 10/2013 | Kobayashi | B60L 11/182 429/7 |
| 2013/0342300 A1 | 12/2013 | Nagata et al. | |
| 2014/0132218 A1* | 5/2014 | Beranger | H01M 10/441 320/118 |
| 2014/0239711 A1* | 8/2014 | Schillinger | G01R 31/3606 307/9.1 |

FOREIGN PATENT DOCUMENTS

| | | |
|---|---|---|
| DE | 202012104339 U1 | 2/2014 |
| EP | 1569249 A1 | 8/2005 |
| EP | 2587614 A2 | 5/2013 |
| WO | 2013099782 A2 | 7/2013 |

OTHER PUBLICATIONS

International Search Report dated Aug. 7, 2015 in corresponding Application No. PCT/EP2015/000783; 14 pgs.
International Preliminary Report on Patentability dated Aug. 19, 2016 in corresponding Application No. PCT/EP2015/000783; 15 pgs.
Translation of the International Preliminary Report on Patentability dated Nov. 24, 2016, in connection with corresponding International Application No. PCT/EP2015/000783 (7 pgs.).

* cited by examiner

ENERGY STORE, ENERGY STORE ARRANGEMENT FOR A MOTOR VEHICLE AND MOTOR VEHICLE

BACKGROUND

The invention relates to an energy storage device comprising a housing part, in which at least one electric energy storage cell as well as at least one electric connection means are arranged, wherein the electric energy storage cell is electrically connected with an external electrical connection means arranged or built on at least one freestanding wall section of the housing part.

It is known in the field of motor vehicle technology that electromagnetic emissions, which can be generated by some components through certain "coupling paths or interference paths" such as electrical line connections, can occur with regard to electromagnetic emissions in a shielded region.

Corresponding components are in particular power electronics and control electronics for electrified drives, typically comprising multiple electrical storage devices and energy storage arrangements for motor vehicles simply called batteries. The latter typically generate corresponding electromagnetic coupling or interference paths to the vehicle mass or vehicle body, etc.

Previous measures for reducing electromagnetic emissions, or for attenuating or filtering of electromagnetic emissions, included measures according to which, typically, damping devices are arranged in the area of the corresponding power electronics or control electronics and/or in the area of the corresponding energy storage arrangements. These damping device are separate assemblies requiring a relatively large amount of space, which is typically already very limited in a motor vehicle in any case.

SUMMARY OF THE DISCLOSURE

The object of the invention is therefore to provide an improved energy storage device.

This object is achieved with an energy storage device of the type mentioned above, wherein at least one electrical connecting element is at least partially surrounded by at least one electromagnetic damping element for attenuation of electromagnetic emissions.

The invention thus relates to a particular approach to realizing measures for attenuation or filtering of electromagnetic emissions, and it provides for an integration of means suitable for attenuating or filtering of electromagnetic emissions in an electric energy storage device.

The measure is realized with an electromagnetic damping element, which is structurally designed in such a way that it is suitable for attenuation or filtering of electromagnetic emissions. Under attenuation or filtering of electromagnetic emission should be understood in particular discharge and/or reduction of electromagnetic emissions or electromagnetic interferences.

In general, an electromagnetic damping element, hereinafter referred to simply as a damping element, can be an inductance, a resistor, or in particular an impedance, for example in the form of an EMC core or a ferrite core, or a capacitance; or the damping element can comprise corresponding structural components. In other words, a damping element is generally used in order to realize integrated measures in a corresponding energy storage device for electromagnetic compatibility (EMC), shortened as EMC measures, or to promote or improve this compatibility.

Depending on the specific configuration or nature of the damping element, the damping element can be designed specifically for attenuation of electromagnetic emissions with specific frequencies or specific frequency ranges. It is thus possible to create a damping element that is suitable for attenuation of electromagnetic emissions with frequencies above 100 KHz, typically in a range between 100 kHz and 1 GHz, in particular in a range between 100 kHz and 100 MHz. It is of course also possible to provide different damping elements, each of which attenuates electromagnetic emissions of a certain frequency range so that several such damping elements can be realized for combined attenuation of electromagnetic emissions in a wide range.

The invention is in particular based on the use of installation space for arrangement or integration of at least one suitable damping element that belongs to a corresponding energy storage device, typically with an unused space available in a rectangular or prismatic housing part. This installation space is typically created by corresponding inner wall sections delimiting the housing parts used to accommodate at least one such receiving space that accommodates energy storage cells in the housing part, or by a corresponding receiving space. The installation space that can be used for the integration of damping elements should therefore be individually defined or individually determined for differently configured storage devices, which is to say in particular depending on the number and external shape of respective storage cells accommodated in the housing part.

The damping element is thus typically arranged in the installation space available between an inner wall section and at least one energy storage cell, which is at least partially filled, in particular fully filled. In particular, care should be taken that the damping element or the damping elements fill or fill up this installation space as much as possible, in particular fully, since the attenuation of electromagnetic emissions is then improved in this manner.

Overall, a highly integrated energy storage device is provided with at least one housing element arranged within a housing section on the energy storage side, which thus has at least one damping element integrated in an energy storage device.

The damping element surrounds at least one energy storage cell (cells) as an element arranged between corresponding inner electrical connection means inside the housing part and at least one corresponding freestanding outer wall section of the housing part, or a developed outer electrical connection means extended at least in sections. This electrical connecting element, which is consequently used to electrically contact or connect corresponding internal electrical connection means with a corresponding external electrical connection means, is typically a ribbon-like or track-like electrical line connection. The electrical connecting element can thus be referred to or regarded as a conductor rail.

Under the formulation specifying that the damping element surrounds at least in sections the electrical connecting element is not necessarily understood a direct or indirect contact between the surrounding damping element and the electrical connecting element, which is surrounding it at least in sections. Accordingly, a free space can be formed also between the damping element and the electrical connecting element; which does not contact the damping element or is not in contact with the electrical connecting element, either mechanically or electrically. It is of course also conceivable that the electromagnetic damping element contacts at least one electrical connecting element, at least in sections. The contact between the damping element and the electrical connecting element can be indirect or direct, i.e. with the interposition of at least one other component. In all cases, the damping element or elements is (are) located within the energy storage device, or within the energy storage side of the housing part.

The energy storage device according to the invention can be seen here as a basic unit of a plurality of energy storage devices that are mutually connected to one another and comprise an electric energy storage arrangement. A similar energy storage arrangement is used to supply electric energy to a user on the motor vehicle side, such as for example an electrified power train, or an electric machine or a drive unit on the motor vehicle side. In general, electric energy can be supplied to the energy storage arrangement of users that are designated or regarded as batteries, as well as to high-voltage and low-voltage devices used on the driver side. High-voltage users and low-voltage users are defined according to applicable standards. In the case of high-voltage users, these are users of motor vehicle technology, in particular of hybrid and fuel cells technology and users in electric motor vehicles, typically users of electric energy utilizing DC voltage in the range between 60 and 1,500 Volts, in the AC range between 30 and 1,000 volts. Electricity users who utilize correspondingly lower voltage ranges are therefore low-voltage users.

An energy storage cell arranged within the housing on the energy storage side is an electrochemical module, which typically comprises two electrodes (anode, cathode), a separator arranged between them, and an electrolyte.

Energy storage cells can be for example lithium cells. The energy storage cell can be encased in at least one encasing element, for example in the form of a film made of a plastic material. The electrodes are typically electrically connected via electrical connections on the side of the electrodes by means of at least one outer electrical connecting element formed or developed with freestanding outer wall sections of the housing part. The electrical connecting means on the electrical side as a rule corresponds to the internal electrical connection means mentioned above.

As was mentioned above, by the integration of at least one damping element in an energy storage device, a highly integrated module is realized, which attenuates or filters for example electrical interferences caused by current and/or voltage fluctuations and the associated electromagnetic emissions. This also eliminates or reduces in the same manner the possibility of impairing the stability of an energy storage device, called simply a battery, comprising one or several energy storage devices, so that it is eliminated or reduced in the same manner.

The resistance to interference of such a energy storage arrangement can therefore be improved, in particular with regard to a potential electromagnetic interference environment comprising a motor vehicle. No impairment of the function or the performance of the energy storage arrangement or of both of these items forming an energy storage device will be caused by the at least one such damping element.

In a first embodiment, the damping element can be a shaped body formed from at least one magnetic material. The damping element is in this case to be regarded as inductance or impedance. The shaped body is typically a sintered part, which is to say a component produced by means of a sintering process. The shaping of the shaped body can be carried out within the scope of the manufacturing operations, which is to say as a part of the sintering process. In this case, shaped bodies having in principle any geometries can be realized. The shaped body can then be manufactured individually with respect to its spatial and physical form for a given energy storage device construction, i.e. in particular with regard to the spatial situation within a housing part.

The magnetic material forming the shaped body is for example a ferrite or a ferrite compound, in particular manganese-zing ferrite. Examples of such compositions are $Mn_aZn_{(1-a)}Fe_2O_4$, or nickel-zinc ferrite, a typical composition is $Ni_aZn_{(1-a)}Fe_2O_4$. The shaped body can thus be referred to or considered as an EMC core or ferrite core.

It is advantageous when the shaped body is constructed or designed in such a way that it surrounds the outer circumference of at least one electrical connecting element in its longitudinal direction and/or in the circumferential direction thereof, at least in sections. The same is applicable in general terms and thus in principle also to the damping element. As was already mentioned, the geometrical form of the shaped body and thus also of the damping element should be chosen depending on the structural and design conditions of the energy storage device, which is to say in particular based on the space that is available within the housing part. In principle, an effort should be made to ensure that the shaped body, or the damping element, surrounds the connecting element in the longitudinal direction, i.e. in the direction of the longitudinal extent of the electric connecting element, as well as in the circumferential direction.

As was already mentioned, the shaped body can be in principle produced with an individual form that can be selected while taking into account a given construction of an energy storage device, i.e. in particular with regard to the amount of the space available within the housing part. It follows from this that the shaped body can in principle be provided with any cross-sectional geometries. The shaped body can thus be provided for example at least in sections with a round and/or at least in sections with a square cross-section. The shaped body can thus be designed for example as a ring or as a hollow cylinder or square, optionally perforated, or as having an annular or cylindrical or parallelpiped form. Corresponding perforated annular or cylindrical or parallelpiped basic shapes are based for example on C-shaped or U-shaped cross-sectional geometries. It goes without saying that other cross-sectional geometries are in principle also conceivable.

In a second embodiment form, the damping element is designed as an electrical capacitor, or it comprises at least one electrical capacitor. The damping element is thus to be regarded here as a capacitor. However, as was already mentioned, although a physical-mechanical contact between the damping element and the electrical connecting element is not necessarily required, an electrical contact is typically created in this embodiment between the electrical connecting element and the damping element, i.e. the capacitor.

It is of course also possible to create also the damping element according to the first embodiment as the damping element according to the second embodiment.

The invention also relates to an energy storage arrangement for a vehicle. The energy storage arrangement comprises a plurality of energy storage devices, which are mutually electrically connected, typically connected in series. At least one energy storage device of the energy storage arrangement is an energy storage device described above, which is to say an energy storage device equipped with at least one corresponding damping element. The energy storage arrangement is in particular a rechargeable battery supplying electricity to different electricity users on the side of the motor vehicle. The energy storage arrangement is thus in particular connected to the electrical system of the motor vehicle.

The same explanations in the context of an energy supply device are similarly applicable also to the energy storage arrangement.

A particular advantage of the energy storage device described above is shown in the context of a corresponding energy storage arrangement. This advantage is that the energy storage arrangement can be equipped with energy storage systems that meet the requirement for conventional energy storage systems in accordance with the principle of this invention. It is of course also conceivable to retrofit existing energy storage arrangements with at least one of the energy storage devices corresponding to the principle according to this invention. Required or targeted attenuation or filtering of electromagnetic emissions can be realized in either case. The extent and the localization of the attenuation or filtering can be influenced in particular by the number and by the arrangement of the energy storage devices.

The invention further relates also to a motor vehicle comprising at least one corresponding energy storage arrangement. All the statements in the context of the energy storage device, as well as in the context of the energy storage arrangement, are similarly applicable to the vehicle.

BRIEF DESCRIPTION OF THE DRAWINGS

Further advantages, features and details of the invention will become evident from embodiment examples and the figures attached below. The figures show the following.

DETAILED DESCRIPTION OF THE DRAWINGS

Figure 1:
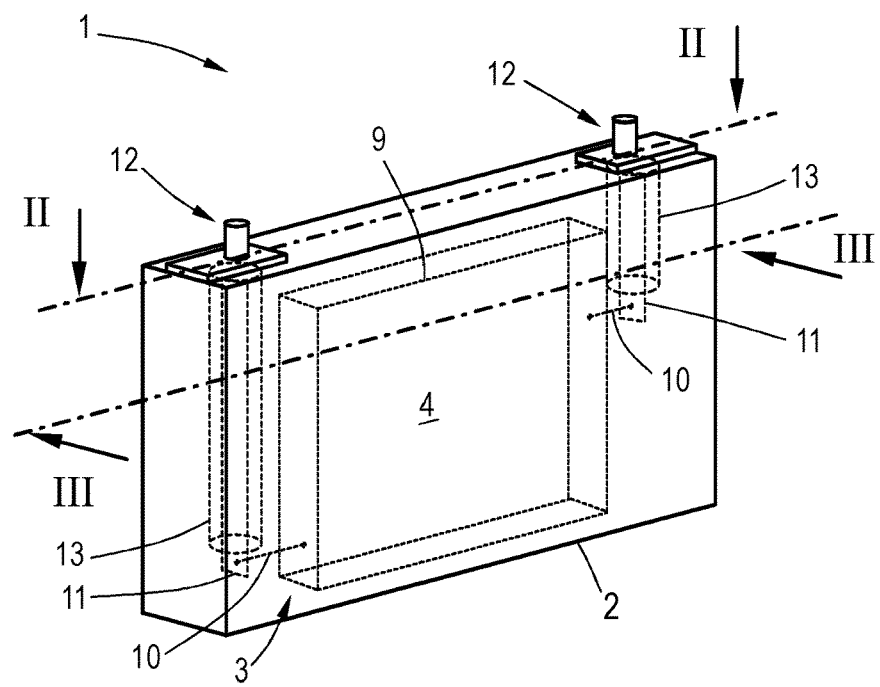
FIG. 1~3 respective schematic representations of an energy storage device according to one embodiment of the invention.
Figure 2:
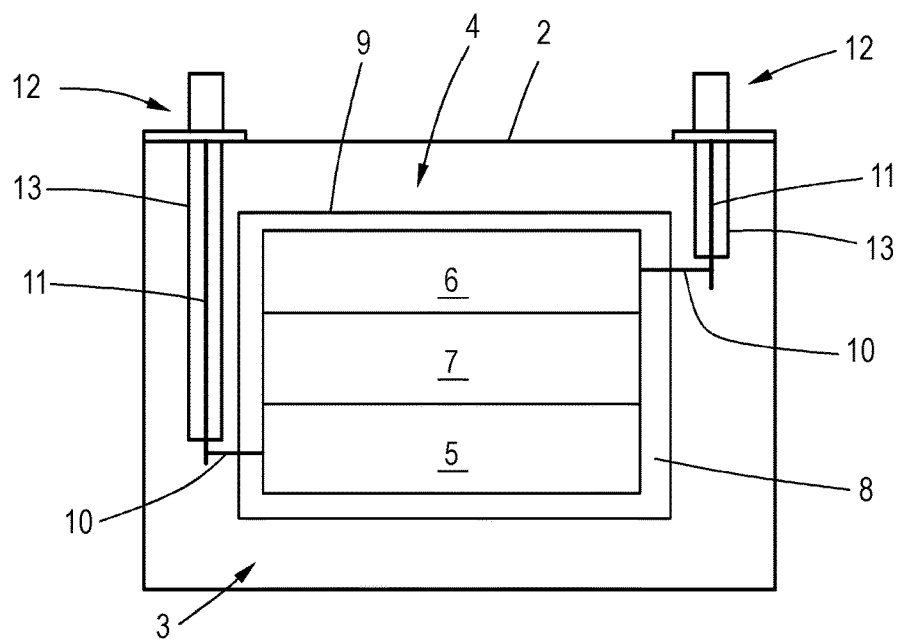
Figure 3:
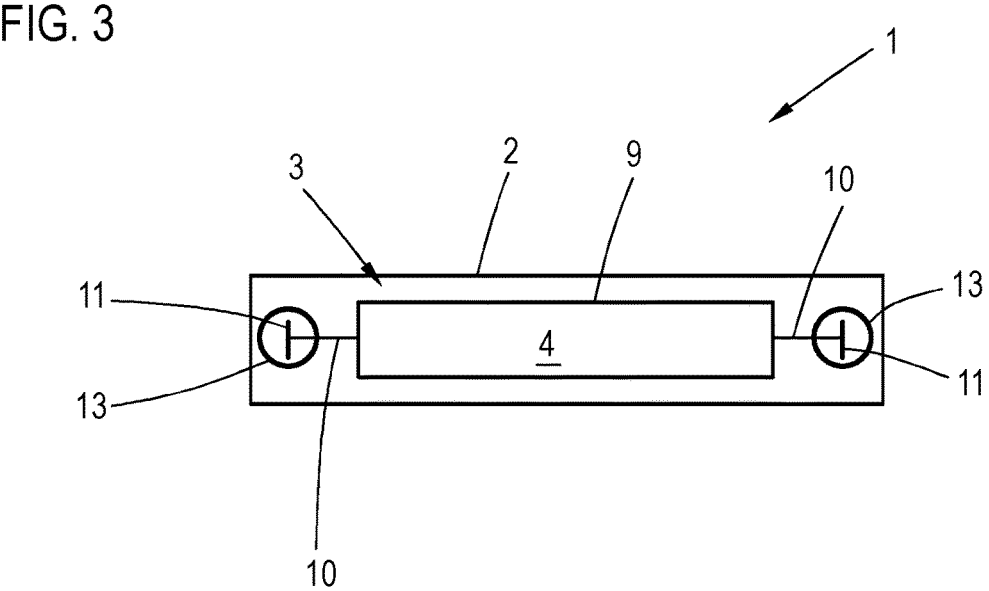

FIG. 1~3 respectively show a schematic representation of an electric energy storage device according to one embodiment of the invention. FIG. 1 shows a perspective illustration of the energy storage device, FIG. 2 shows a vertical section through the energy storage device according to the sectional lines II-II shown in FIG. 1, and FIG. 3 shows a horizontal section through the energy storage device 1 according to the sectional lines III-III shown in FIG. 1.

The energy storage device 1 comprises a cuboidal housing part 2. The housing part 2 is made for example from aluminum or from an aluminum compound. The housing part 2 defines in its interior, i.e. through corresponding inner wall sections, an equally cuboidal receiving space 3 (see FIG. 2, 3), which is used to receive at least one energy storage cell 4. In the receiving space 3 can thus be accommodated at least one energy storage 4, which is in particular also cuboidal and therefore prismatic.

An energy storage cell 4 comprises, as can be seen in particular from FIG. 2, multiple, in particular electrochemical, functional components. This includes in particular two electrodes, 5 and 6, in the form of an anode and a cathode, and a separator 7 arranged between the electrodes 5 and 6, as well as an electrolyte 8. The functional components of the energy storage cell 4 are encased in an encasing element 9, which consists of a film formed from a plastic material. It is conceivable when a plurality of corresponding functional components are located within the encasing element 9 in the arrangement described above. The illustration of the energy storage cell shown in FIG. 2 is therefore purely schematic.

In each of the cases, the energy storage cell 4 is provided with electrical connection means 10, which will hereinafter be referred to as internal electrical connection means 10. The internal electrical connection means 10 are electrically connected through respective rail-shaped elements 11 to an outer electrical connection means 12 arranged or formed on a freestanding outer wall section of the housing part 2. The freestanding outer wall section is in the example of the embodiment shown in the figures defined by the upper side of the housing part 2.

The electrically connecting elements 11 are in each case surround by a damping element 13, which is provided, viewed as a cross-section, as an annular and therefore hollow and cylindrical damping element for attenuating or filtering of electromagnetic emissions. In this case, a contact can be provided, respectively, between a damping element 13 and the electrical connection elements which is surrounded by it. This, however, is not absolutely necessary.

The damping element 13 fully surrounds respective electrical elements 11 both in the longitudinal as well as in the circumferential direction, since this is made possible by the unused installation space available within the housing part 2. If the unused available installation space within the housing part 2, which in general represents a part of the space of the receiving space 3 on the side of the housing, is smaller or larger, the respective housing elements 13 should be dimensioned differently with respect to their spatial and physical status.

In principle, care should be taken to completely fill up with the damping elements 13 the installation space between the inner wall sections of the housing part 2 delimiting the receiving space 3 and the available unused installation space arranged in the receiving space for the energy storage cell.

The damping elements 13 are provided in the form of a shaped body formed from magnetic materials, i.e. in particular ferrite, typically $Fe_2O_3$. These are ferrite parts that were produced by means of a sintering process. Typically, the shaping of the shaped body or of the damping elements 13 takes place during the sintering process.

In principle, it is also conceivable to form the damping elements as capacitors, wherein an electrical contact is provided between the electrical contact elements 11 and the damping elements 13.

Figure 4:
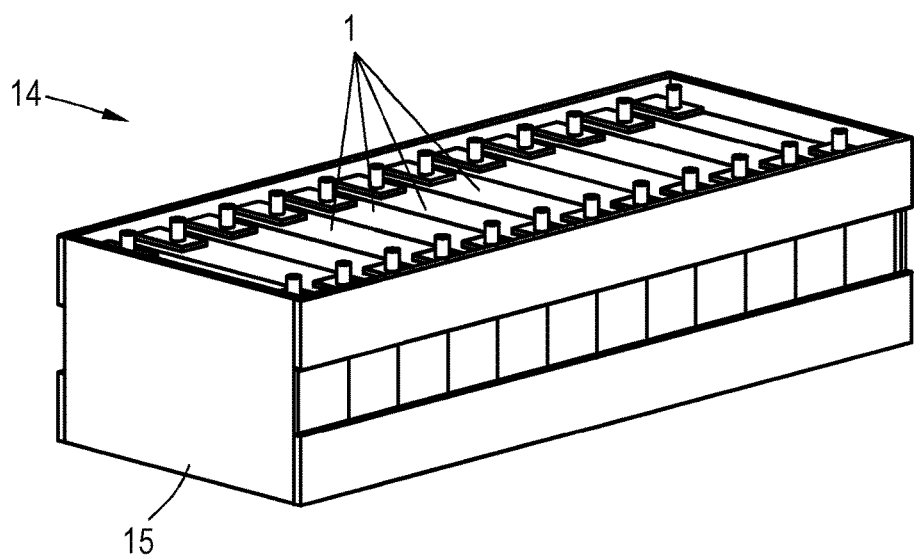
FIG. 4 a schematic representation of an energy storage arrangement on the vehicle side according to one embodiment of the invention.

FIG. 4 shows a schematic representation. of an energy storage arrangement 14 according to an embodiment of the invention on the side of a motor vehicle. The energy storage arrangement 14 is generally used to supply electric energy for different types of consumption of electric energy on the side of a motor vehicle, which is to say which are built into motor vehicle (not shown). The energy storage arrangement 14 serves in this case for example to supply at least one drive unit of an electrical machine (not shown) used by the motor vehicle, i.e. an electromotor. Control electronics (not shown) are typically connected in order to control the performance of the electrical machine between the energy storage arrangement 14, which is to be designated or regarded as a high-voltage battery, and the electrical machine.

The energy storage arrangement 14 comprises a number of energy storage devices 1, which are mutually electrically connected, i.e. serially. Certain energy storage device 1 can in this case be designed according to the embodiments indicated in FIGS. 1-3. Other energy storage devices can be designed in a conventional manner, which is to say without integrated damping elements 13. All the energy storage arrangements 14 forming the energy storage unit 1 are retained in the frame-like retaining unit 15.

A highly integrated module is realized with the integration of corresponding damping elements 13 in an energy storage device 1, which attenuates or eliminates electromagnetic emissions, for example emissions related to current and/or voltage fluctuations and the like. In this manner, the possibility of impairment of the stability of the energy storage arrangement 14 is also eliminated or reduced at the same time, without requiring modifications of the construction.

The resistance of the energy storage arrangement 14 to interferences can thus be improved, in particular with respect to improving resistance with a given potential electromagnetic interference environment surrounding the motor vehicle. The damping elements 13 do not have any detrimental influence on the function or on the performance or capability of the energy storage arrangement 14, or of the energy storage devices 1 forming the arrangement.

The invention claimed is:

1. An Energy storage device, comprising:
   a housing part, in which at least one electrical energy storage cell and at least one electrical connection element are arranged, wherein the electrical energy cells are connected by at least one electrical connecting element with at least one connection arranged or built on at least one freestanding outer wall section of the housing part;
   wherein the at least one electrical connecting element is surrounded at least in sections by at least one electromagnetic damping element for attenuation of electromagnetic emissions, wherein the electromagnetic damping element is arranged in the housing part, wherein the electromagnetic damping element is arranged in an installation space, which it fills at least in sections, between at least one inner wall section of the housing part and the at least one energy storage cells;
   wherein the electromagnetic damping element is a shaped body formed from at least one magnetic material, wherein the magnetic material is ferrite or a ferrite compound, and wherein the shaped body surrounds the outer circumference of at least one electrical connecting element in the longitudinal direction and in the circumferential direction.

2. The energy storage device according to claim 1, wherein the electromagnetic damping element is arranged in the installation space between at least one inner wall section of the housing part and the at least one energy storage cell, which it fills up fully.

3. The energy storage device according to claim 1, wherein the electromagnetic damping element does not touch or at least touches only in sections the at least one electrical connection means.

4. The energy storage device according to claim 1, wherein the magnetic material is the ferrite compound, and is selected from the group consisting of manganese-zinc-ferrite or nickel-zinc-ferrite.

5. The energy storage device according to claim 1, wherein the shaped body is provided, at least in sections, with a round and angular cross-section.

6. The energy storage device according to claim 5, wherein the shaped body is designed as a ring, hollow cylinder or cuboid, with an optionally perforated, annular, cylindrical or cuboid basic form.

7. The energy storage device according to claim 1, wherein the electromagnetic damping element is designed as an electrical capacitor, or is at least one electrical capacitor.

8. The energy storage device according to claim 1, wherein the housing part is designed with a cuboidal form.

9. The energy storage device according to claim 1, wherein the energy storage cells comprise at least two electrodes, at least one separator, which is arranged or built between the at least two electrodes, and at least one electrolyte, wherein the electrodes are connected by means of a connection means on the side of the electrodes via at least one connecting element with outer electrical connection means arranged or formed on a freestanding outer wall section of the housing part.

* * * * *